April 7, 1931.  E. F. MAAS ET AL  1,800,183
METHOD OF ASSEMBLING STRIP MATERIAL
Filed Jan. 17, 1928  2 Sheets-Sheet 2

Inventor
Elov F. Maas.
Robert W. Snyder.

By R. S. Trogner

Attorney

Patented Apr. 7, 1931

1,800,183

UNITED STATES PATENT OFFICE

ELOV F. MAAS AND ROBERT W. SNYDER, OF AKRON, OHIO, ASSIGNORS TO THE GOODYEAR TIRE & RUBBER COMPANY, OF AKRON, OHIO, A CORPORATION OF OHIO

METHOD OF ASSEMBLING STRIP MATERIAL

Application filed January 17, 1928. Serial No. 247,330.

This invention relates to laminated fabrics and it has particular relation to a novel method and apparatus for assembling the constituent parts of breaker strip material for use in the construction of pneumatic tire casings.

It is customary in the manufacture of breaker strip material to remove strips of fabric individually from a bias cutting machine and place them in so-called "books", in which condition they are transported to other devices for further treatment. The above-mentioned books comprise a plurality of sheets of liner material bound together along one side and are adapted to receive a single bias cut strip between each pair of sheets. Obviously, much labor is involved in thus transporting the bias cut strips from one apparatus to another.

The primary object of this invention is to provide a method and apparatus whereby the bias cut pieces may be united into a continuous strip, one or more layers of cushioning material applied to the strip, and the strip wound with an interposed liner into a roll, all in one continuous operation.

A further object of the invention is to provide a novel method and apparatus whereby a plurality of fabric pieces moving in edge to edge relation upon a support may be united and drawn from the support as a continuous strip. The invention also involves certain novel features of construction and arrangements of elements which will be fully pointed out hereinafter.

For a better understanding of the invention, reference may now be had to the accompanying drawings, forming a part of the disclosure, in which.

Figure 1:
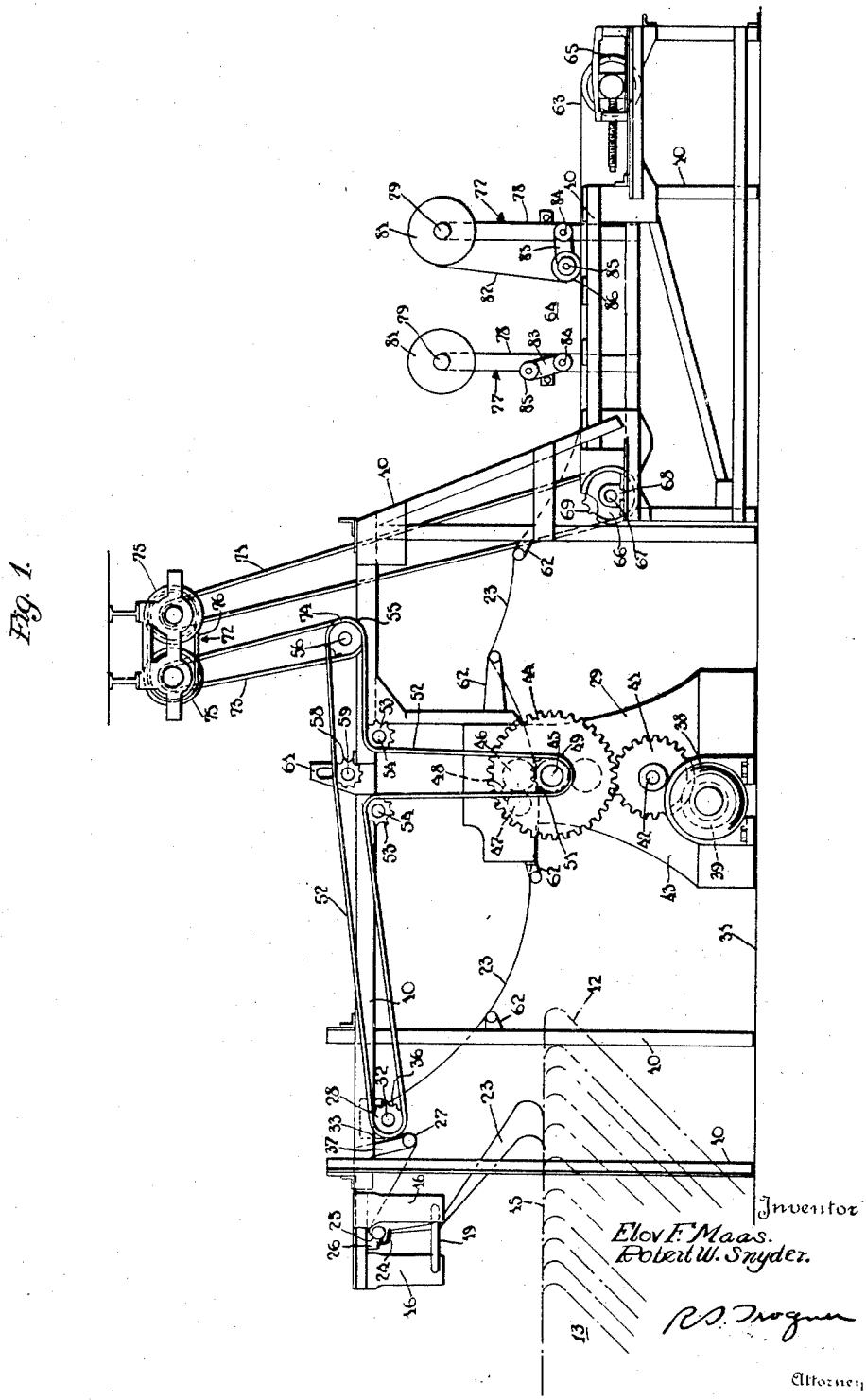
Figure 1 is a side-elevational view of an aggroupment of instrumentalities embodying the novel features of the invention.
Figure 2:
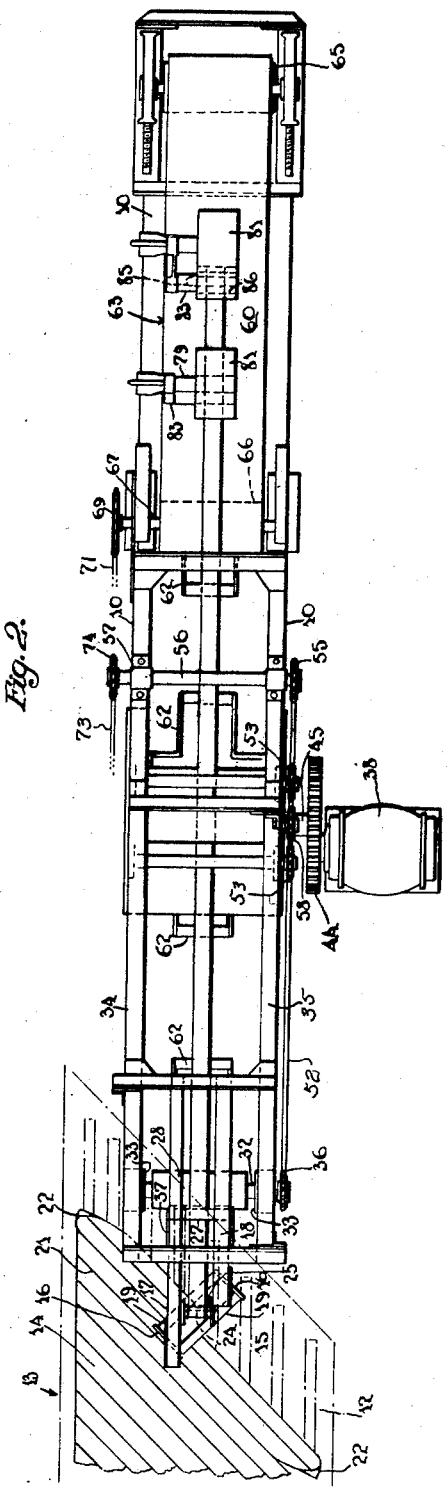
Figure 2 is a plan view of the apparatus shown in Figure 1.
Figure 3:
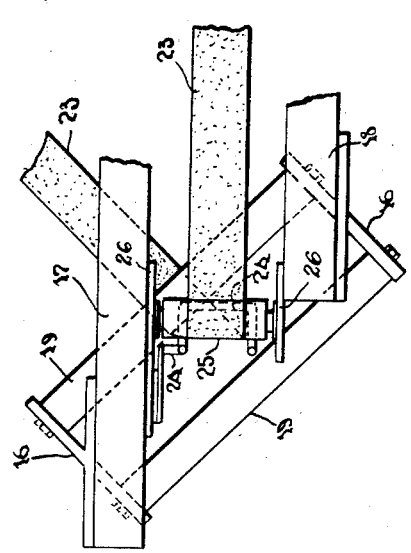
Figure 3 is a detail view, upon a larger scale, of a strip guiding means.

In the embodiment of the invention illustrated in the accompanying drawings a frame 10, which supports various parts of the apparatus, is disposed adjacent a frame 12 of a horizontal bias cutting machine 13. Since the bias cutting machine 13 is of conventional form, only that portion thereof which coacts with the other instrumentalities of the apparatus is herein shown.

As usual, the bias cutting machine 13 embodies means for severing a strip of fabric on a bias into a plurality of pieces 14 which are conveyed in edge to edge relation along a table 15 of the machine. A pair of bracket elements 16, secured to and depending from respective frame members 17 and 18, rotatably support a pair of spaced guide rollers 19. The axes of the rollers 19 extend at right angles to the lines of severance 21 between adjacent pieces 14 in order that after the pieces have been united at their ends, as indicated at 22, to form a continuous strip 23, the rollers will engage alternately with the strip as the latter is raised from the table 15.

A guide member 24 of U-shape depends from the member 17 midway between the bracket elements 16 and guides the strip 23 over a freely rotatable roller 25 journalled in brackets 26 depending from the frame members 17 and 18. From the roller 25 the strip 23 passes under an idle roller 27 and over a power driven roller 28 to a calender machine 29 which may be bolted to the same bed plate 31 that supports the bias cutter 13.

The roller 28 is carried by a shaft 32 journalled in depending brackets 33 secured to frame members 34 and 35, and has a sprocket wheel 36 mounted on an end thereof for driving the shaft. The roller 27 is supported in a plane below the roll 28, by arms 37 depending from the frame members 34 and 35 respectively, so that the strip 23 is caused to engage a large portion of the surface of the roll 28.

A motor 38, bolted to the bed plate 31, has a pinion 39 keyed to its shaft which meshes with an idler gear 41 mounted on a stub shaft 42 secured to the frame 43 of the calender 29. The gear 41 meshes with a gear 44 keyed to the main driving shaft 45 of the calender.

The calender machine 29 may be of any well known type which is capable of applying a layer of cushioning material to one or both sides of a fabric strip fed therethrough. As shown, rotation of rollers 46 and 47, having a batch 48 of cushioning material disposed therebetween, serves to form a continuous layer of material upon the roll 46 which is progressively applied to the strip 23 as the latter is fed between the roller 46 and a roller 49 mounted directly upon the shaft 45.

A sprocket wheel 51, keyed to the shaft 45, drives an endless chain 52 which passes over idler sprockets 53 mounted on stub shafts 54 secured to the frame 10, over sprocket 28 to drive the shaft 32 and over sprocket 55 to drive a shaft 56 journalled in bearings 57 mounted on the frame members 34 and 35. The chain 52 also passes over an idler wheel 58 rotatably mounted on a stub shaft 59 which is adjustably carried by a slotted bracket 61 secured to the frame 10.

Roller carrying brackets 62, secured to portions of the frame 10 and to the frame of the calender 29, serve to guide the strip 23 to and from the calender 29. The strip 23 passes from the last bracket 62 to a conveyor 63, which carries it to the wind-up mechanism 64. As shown, the conveyor 63 comprises an endless band 60 trained about a roller 65 adjustably journalled in the frame 10 and a roller 66 carried by a shaft 67 journalled in bearings 68 secured to the frame 10.

A sprocket wheel 69, keyed to the shaft 67, is driven through the agency of an endless chain 71 from a speed control device 72 which is, in turn, driven by an endless chain 73 engaging a sprocket wheel 74 keyed to the shaft 56. Any desired form of speed controlling device may be employed. The form shown in the accompanying drawing comprises a pair of oppositely tapered rollers 75 and an endless belt 76 passing about the two rollers so that movement of the belt 76 longitudinally of the rollers 75 will vary the speed of travel of the chain 71.

In order that the operation of the complete apparatus may be continuous, a pair of like wind-up devices 77 are provided. Each of these devices comprises an upright member 78 secured at its lower end to the frame 10, which supports at its upper end a shaft 79 upon which a roll 81 of liner material 82 may be rotatably mounted. An arm 83, pivotally connected, as indicated at 84, to the frame member 78, rotatably supports a roller 85 which is adapted to be rotated by movement of the conveyor 63 to wind the cushion strip 23 and the liner 82 into a roll 86. While one of the units 77 is operating, a new roll 81 may be positioned on and a full roll 86 may be removed from the other unit.

In practice, operators stand at each side of the table 15 of the bias cutter 13 to splice the ends of the pieces 14, in order that a continuous strip 23 may be fed by the roller 28 to the calender machine 29. From the calender the strip 23, to which one or more layers of cushioning material have been applied, is guided to the conveyor 63 which carries it to the wind-up mechanism 64.

Although we have illustrated only one form which the invention may assume and have described in detail only a single application thereof, it will be apparent to those skilled in the art that the invention is not so limited, but that various minor modifications may be made therein without departing from the spirit of the invention or from the scope of the appended claims.

What we claim is:

1. A method of producing a continuous strip of material which comprises cutting strips transversely from a sheet of material and splicing the ends of the consecutively cut strips alternately at opposite sides of the sheet of material.

2. A method of producing a strip of material which comprises cutting strips transversely from a sheet of material, splicing the ends of the consecutively cut strips alternately at opposite sides of the sheet of material, and conveying the spliced strips in a continuous length from the location of the cutting operation.

3. A method of producing strips of material which comprises cutting strips transversely from a horizontally disposed sheet of material, splicing the ends of adjacent strips alternately at opposite sides of the cut sheet of material, and elevating the spliced strips in a continuous length to a point above and between the edges of the horizontal sheet of material.

4. A method of producing a strip of material which comprises moving the sheet of material in a horizontal plane, cutting the sheet of material on a bias into adjacent strips, splicing the ends of adjacent strips alternately at opposite sides of the sheet of material, and elevating the spliced strips in a continuous length to a point above and substantially midway between the edges of the path of movement of the sheet of material.

5. A method of producing a continuous strip of material which comprises moving a sheet of material in a horizontal plane, cutting the sheet of material on a bias into adjacent strips, splicing the strips alternately at opposite sides of the path of movement of the path of the material, conveying the spliced strips in a continuous length from the location of splicing, and calendering cushioning material upon the continuous strip.

6. A method of producing a continuous strip of material which comprises moving a sheet of material in a horizontal plane, cutting the sheet of material on a bias into adjacent strips, splicing the ends of adjacent strips alternately at opposite sides of the path of movement of the sheet of material, conveying the spliced strips in a continuous length after the splicing thereof, calendering cushioning material upon the spliced continuous strip, and winding the spliced strip within the convolutions of a liner into a roll.

7. A method of producing a continuous strip of material which comprises moving a sheet of material in a horizontal plane, cutting the sheet on a bias into a series of adjacent strips, splicing the ends of adjacent strips alternately at opposite sides of the path of movement of the sheet, conveying the spliced strips in a continuous length after the splicing thereof, elevating the spliced strips in a continuous length to a point above and between the edges of the plane of the horizontal strip of material and calendering cushioning material upon spliced strips.

8. A method of producing a continuous strip of material which comprises moving a sheet of material in a horizontal plane, cutting the sheet on a bias into a series of adjacent strips, splicing the ends of adjacent strips alternately at opposite sides of the path of movement of the sheet, conveying the spliced strips in a continuous length after the splicing thereof, elevating the spliced strips in a continuous length to a point above and between the edges of the plane of the horizontal strip of material, calendering cushioning material upon the spliced strips, and winding the spliced and calendered strips within the convolutions of a liner into a roll.

9. A method of producing a continuous strip of material which comprises providing a plurality of strips of material lying in edge-to-edge relation upon a support, splicing the ends of adjacent strips alternately at opposite sides of the support and drawing the resulting continuous strip from the support to a point substantially midway between the extremities of the support.

10. A method of producing a continuous strip of material which comprises providing a plurality of strips of material lying in edge-to-edge relation upon a support, splicing the ends of adjacent strips alternately at opposite sides of the support, and drawing the resulting continuous strip from the support to a point above and substantially midway between the sides of the support.

11. A method of producing a continuous strip of material which comprises moving a plurality of strips in edge-to-edge relation laterally upon a support, splicing the ends of adjacent strips alternately at opposite sides of the support, and drawing the resulting continuous strip to a point substantially midway between the sides of the support.

12. A method of producing a continuous strip of material which comprises moving a plurality of strips laterally in edge-to-edge relation upon a support, splicing the ends of adjacent strips alternately at opposite sides of the support, drawing the resulting continuous strip from the support to a point intermediate the path of movement of the laterally moving strips and progressively applying cushioning material to the continuous strip.

13. A method of producing a continuous strip of material which comprises moving a plurality of strips laterally in edge-to-edge relation upon a support, splicing the ends of adjacent strips alternately at opposite sides of the support, drawing the resulting continuous strip from the support to a point midway between the sides of the support, progressively applying cushioning material to the continuous strip, and winding the cushioning strip within the convolutions of a liner into a roll.

14. A method of producing a continuous strip of material which comprises cutting a plurality of strips on a bias from a sheet of material, moving the cut strips laterally from the location of cutting, splicing the ends of adjacent strips alternately at opposite sides of the path of movement of the laterally moving strip, progressively applying cushioning material to the strips and winding the cushioning strip within the convolutions of a liner into a roll.

In witness whereof, we have hereunto signed our names.

Signed at Akron, in the county of Summit, and State of Ohio, this 13 day of January, 1928.

ELOV F. MAAS.
ROBERT W. SNYDER.